(12) United States Patent
Reynolds

(10) Patent No.: US 7,656,571 B1
(45) Date of Patent: Feb. 2, 2010

(54) BALANCED LIGHT VALVE

(75) Inventor: Meritt W. Reynolds, Burnaby (CA)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/183,094

(22) Filed: Jul. 31, 2008

(51) Int. Cl.
*G02F 1/03* (2006.01)
*G02F 1/153* (2006.01)
*G02F 1/155* (2006.01)

(52) U.S. Cl. .................. 359/261; 359/275; 359/266

(58) Field of Classification Search ......... 359/260–261, 359/247, 275, 282, 288, 245, 237–238, 266–267
See application file for complete search history.

(56) References Cited

U.S. PATENT DOCUMENTS

| | | | |
|---|---|---|---|
| 4,281,904 A | 8/1981 | Sprague et al. | |
| 4,406,521 A | 9/1983 | Mir et al. | |
| 4,780,732 A * | 10/1988 | Abramov | 347/239 |
| 5,291,566 A * | 3/1994 | Harris | 385/8 |
| 5,734,491 A | 3/1998 | Debesis | |
| 5,841,579 A | 11/1998 | Bloom et al. | |
| 6,288,822 B2 | 9/2001 | Romanovsky | |

* cited by examiner

*Primary Examiner*—Scott J Sugarman
*Assistant Examiner*—Dawayne A Pinkney
(74) *Attorney, Agent, or Firm*—Nelson Adrian Blish

(57) ABSTRACT

Radiation from an illumination source (102) is directed to a total internal reflector (TIR) modulator (10). The modulator includes a an electro-optic member (213) with a plurality of individually addressable pixel regions (210) comprised of a plurality of electrodes arranged in a first and second set. At least one electrode of the first set is adjacent to at least one electrode of the second set and at least one of the pixel regions is controlled to form at least one image pixel on a surface. A first electric potential is imposed on the first set of electrodes selected from a first predetermined group of electric potential values. A second electric potential is imposed on the second set of electrodes selected from a second predetermined group of electric potential values. The first and second predetermined groups of electric potential values together comprise at least three different electric potential values.

29 Claims, 9 Drawing Sheets

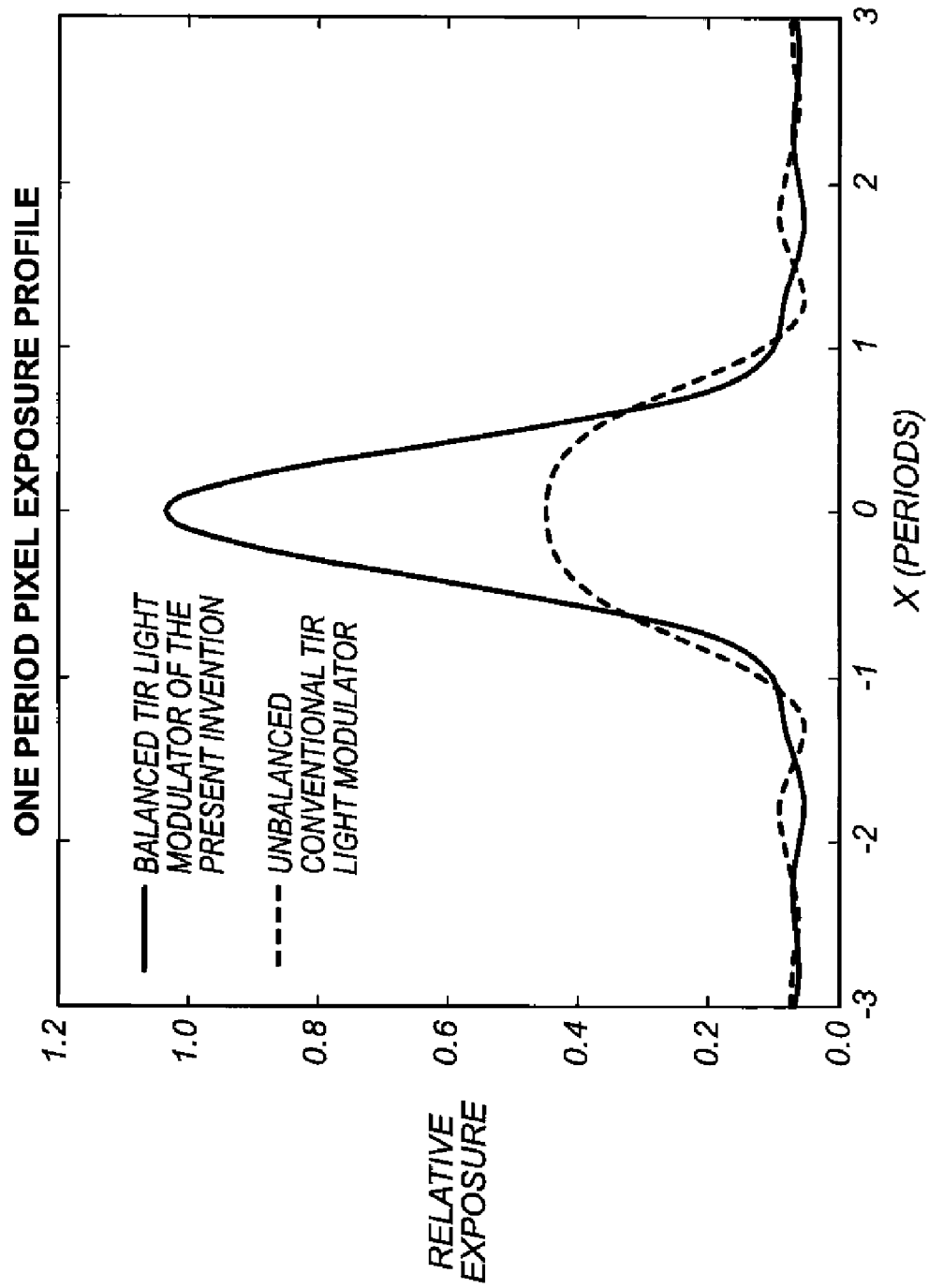

BALANCED LIGHT VALVE

FIELD OF THE INVENTION

The invention relates to an apparatus for forming images on a surface, and more particularly to improvements to an electro-optic light modulator.

BACKGROUND OF THE INVENTION

Electro-optic materials are those whose optical properties change in accordance with the strength of an electric field established within them. These materials make possible an electrically controlled electro-optic modulator for use in a light valve array.

One well known form of electro-optic modulator arrays are total internal reflection (TIR) modulators which can be employed in laser-based imaging systems for example. FIGS. 1A and 1B schematically show plan and side views of a conventional TIR modulator 10 comprising a member 12 which includes an electro-optic material and a plurality of electrodes 15 and 16 arranged in an interdigitated relationship on a surface 18 of member 12. Surfaces 20 and 22 are arranged to cause input radiation 25 to refract and undergo total internal reflection at surface 18.

In this typical conventional configuration, various electrodes 15 and 16 are grouped into electrode groups $S_1$, $S_2$, $S_3$, $S_4 \ldots S_n$ which are collectively referred to as electrode groups S. Each of the electrodes 15 in each of the groups are coupled together and driven with corresponding one of individually addressable voltages sources $V_1$, $V_2$, $V_3$, $V_4 \ldots V_n$ which are operated in accordance with various image data signals. To simplify interconnect and driver requirements, all electrodes 16 are interconnected to a common source (e.g. a ground potential). In this case, electrodes 16 are coupled in a serpentine fashion among all the groups S.

Upon the application of a suitable voltage by one of the voltage sources $V_1$, $V_2$, $V_3$, $V_4 \ldots V_n$ to a corresponding one of the electrode groups $S_1$, $S_2$, $S_3$, $S_4 \ldots S_n$, an electric field is established in a portion of the of the electro-optic material referred to as a pixel region. The application of the voltage alters the refractive index of the electro-optic material, thereby changing a birefringent state of the pixel region. Under the application of the corresponding drive voltage, the arrangement of electrodes 15 and 16 in each of the electrode groups $S_1$, $S_2$, $S_3$, $S_4 \ldots S_n$ causes each of the electrode groups to behave in a manner similar to a diffraction grating. A birefringent state of the each of the pixel regions can therefore be changed in accordance with the selective application of various voltages by corresponding voltage sources $V_1$, $V_2$, $V_3$, $V_4 \ldots V_n$. For example, in this case when no voltage is applied to a particular electrode group S, the corresponding pixel region assumes a first birefringent state in which output radiation 27 is emitted from surface 22 and is directed by one or more lenses (not shown) towards a surface of a recording media (also not shown) to form an image pixel thereon. In the case when a suitable voltage is applied to a particular electrode group S, the corresponding pixel region assumes a second birefringent state in which output radiation 27 is emitted from surface 22 in a diffracted form which can be blocked by an obstruction such as an aperture to not form an image pixel.

Various image features are formed on a recording media by combining image pixels into arrangements representative of the image features. It is a common desire to form high quality images with reduced levels of artifacts. In particular, the visual quality of the formed image features is typically dependant on the visual characteristics of the formed image pixels themselves. For example, one important characteristic is the contrast between an image feature and surrounding regions of the recording media. Poor contrast can lead to the formation of various image features whose edges lack sharpness or are otherwise poorly defined. Another important characteristic is the accurate placement of the image pixels on the recording media.

The conventional method of driving the arrangement of electrodes 15 and 16 as previously described can lead to various problems which can adversely impact a desired visual characteristic of the final image. For example, the sharpness of feature edges can suffer or an undesired deflection of output radiation 27 can arise. FIG. 1C schematically shows a subset of electrode groups $S_1$, $S_2$, $S_3$, and $S_4$ driven with various voltage levels by their corresponding voltage sources as follows: ($V_1$:V); ($V_2$:V); ($V_3$:0); and ($V_4$:V). Voltage level V corresponds to a drive voltage level selected to cause substantial diffraction to be created by a pixel region whereas voltage level 0 corresponds to a voltage level (i.e. a ground potential in this case) selected to not cause substantial diffraction to be created by a pixel region. When a pixel region is made non-diffracting (e.g. the pixel region corresponding to electrode group $S_3$) the average electric potential of the electrodes 15 and 16 of the pixel region is null. However, when a pixel region is made diffracting (e.g. the pixel regions corresponding to electrode groups $S_1$, $S_2$ and $S_4$) the average electric potential of the electrodes 15 and 16 of the pixel region is approximately V/2. This creates an electric potential difference of V/2 between the average voltages of non-diffracting and diffracting regions of TIR modulator 10. This can give rise to long-range electric fields that deflect radiation that is propagated within the electro-optic material to produce a beam steering effect. Although the long-range fields can be relatively weak, they typically interact with the radiation over a longer path length than the shorter range diffraction grating fields.

One possible consequence of this deflection is that image pixels formed on the recording media can be shifted and a placement error arises. The degree of the placement error can vary in accordance with the image data which controls the selective application of the drive voltages. Another possible consequence can include an increase in the diffraction broadening of an image pixel since the output radiation 27 is deflected to one side in the pupil of the imaging system, thereby reducing the effective aperture of the system. Other possible consequences can include an increased sensitivity to aberrations in the imaging system.

There is, therefore, a need for improved TIR modulators that can mitigate beam steering effects. There is also a need for improved TIR modulators that can reduce occurrences of improperly formed image pixels.

SUMMARY OF THE INVENTION

Briefly, according to one aspect of the present invention radiation from an illumination source is directed to a total internal reflector (TIR) modulator. The modulator a includes an electro-optic member with a plurality of individually addressable pixel regions, each of the pixel regions comprised of a plurality of electrodes arranged in a first and second set. At least one electrode of the first set is adjacent to at least one electrode of the second set and at least one of the pixel regions is controlled to form at least one image pixel on a surface. A first electric potential is imposed on the first set of electrodes selected from a first predetermined group of electric potential values. A second electric potential is imposed on the second set of electrodes selected from a second predetermined group of electric potential values. The first and second predetermined groups of electric potential values together comprise at least three different electric potential values.

The invention and its objects and advantages will become more apparent in the detailed description of the preferred embodiment presented below.

BRIEF DESCRIPTION OF THE DRAWINGS

Embodiments and applications of the invention are illustrated by the attached non-limiting drawings. The attached drawings are for purposes of illustrating the concepts of the invention and may not be to scale.

FIG. 6B is a graph simulating one period pixel exposure profiles associated with the formation of an image pixel as compared between a balanced light modulator of the present invention and an unbalanced conventional TIR light modulator.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1A:
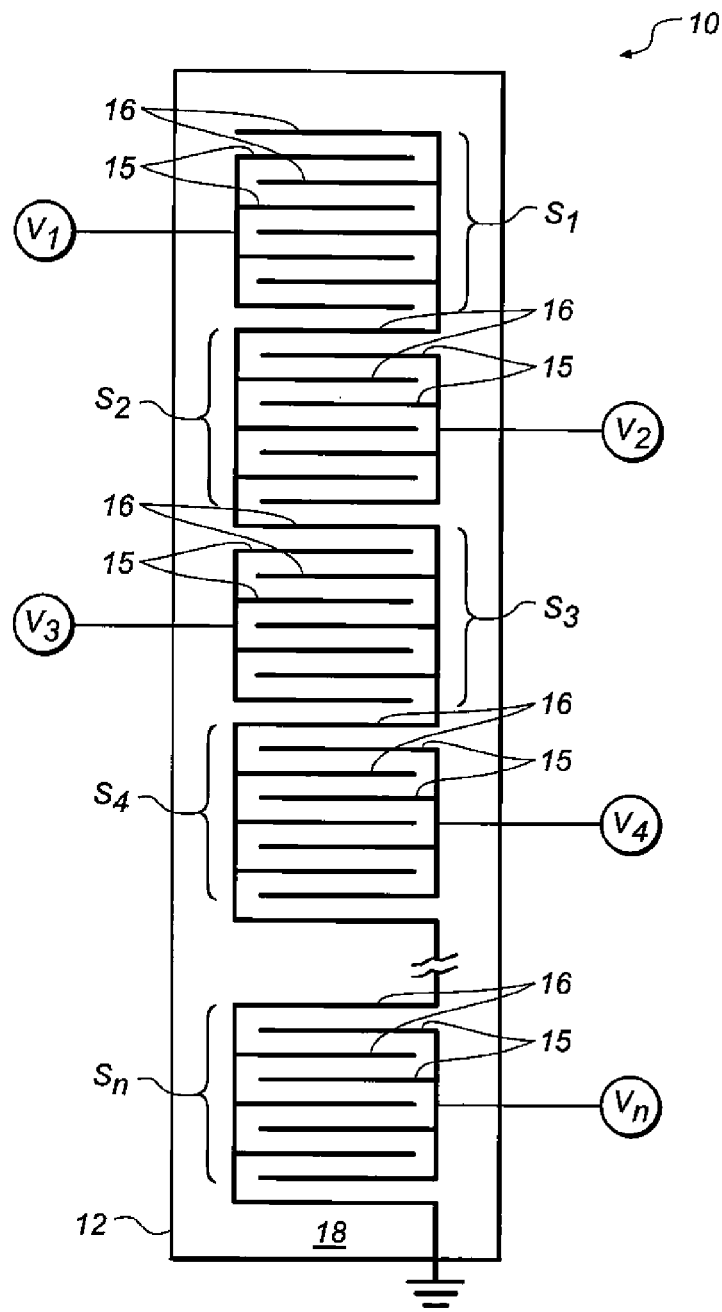
FIG. 1A is a prior art schematic plan view of a conventional TIR modulator.
Figure 1B:
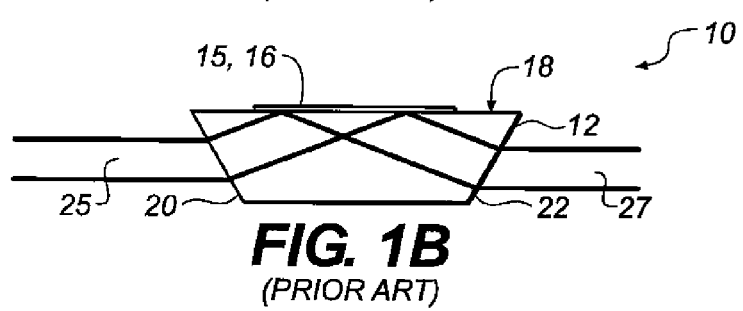
FIG. 1B is a prior art schematic side view of the conventional TIR modulator of FIG. 1A.
Figure 1C:
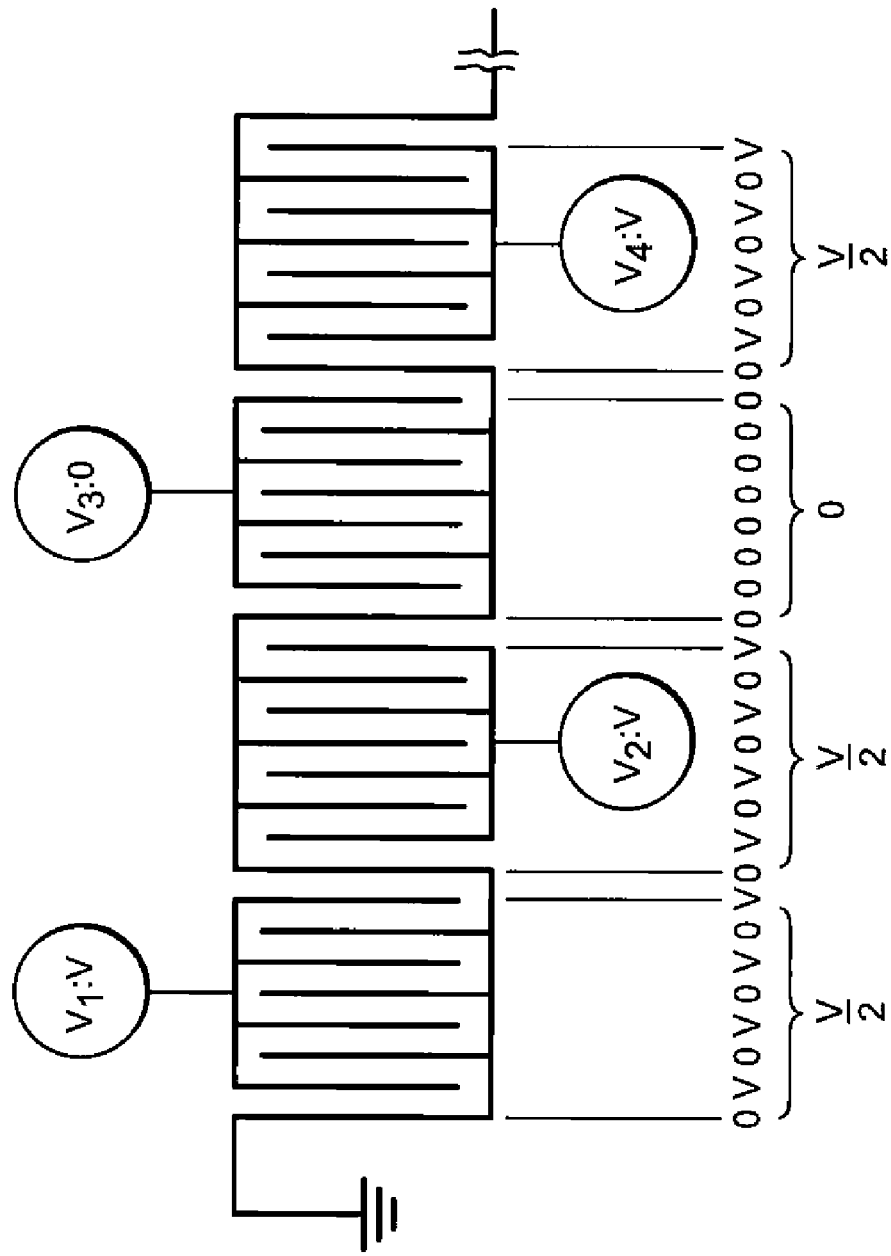
FIG. 1C is a prior art schematic showing a subset of electrode groups of the conventional TIR modulator of FIG. 1A driven by various voltage levels.
Figure 2:
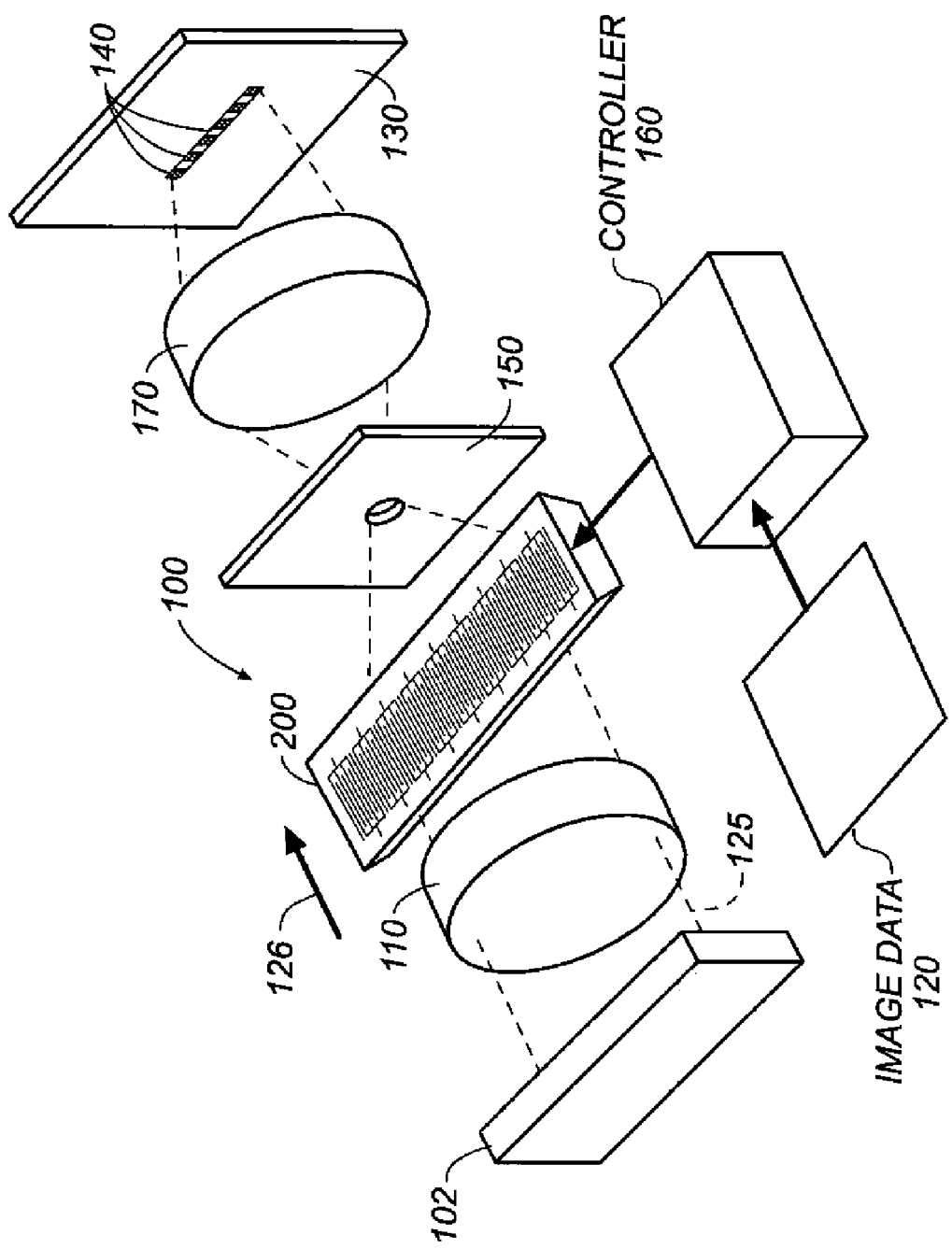
FIG. 2 schematically shows an imaging apparatus as per an example embodiment of the invention.

FIG. 2 schematically shows an imaging apparatus 100 employed by an example embodiment of the invention. Imaging apparatus 100 includes an illumination source 102 which can include a laser for example. Suitable lasers can include laser diode arrays which are relatively easy to modulate, have relatively low cost and have relatively small size. The choice of illumination source 102 can be motivated by the properties of recording media 130 that is to be imaged by imaging apparatus 100. One or more optical elements 110 are positioned along the path of radiation 125 emitted by illumination source 102 towards light modulator 200. Optical elements 110 can include one or more lenses employed to condition radiation 125 in various ways. For example, when diode laser arrays are employed, various degrees of beam divergence can exist along a plurality of directions. Beam divergence can include fast axis divergence and slow axis divergence for example. Optical elements 110 can include various lenses adapted to correct these divergences such as micro-lenses or crossed cylindrical lenses. Optical elements 110 can include various elements adapted to mix or reflect various radiation beams such as light pipes and fly's eye integrators for example. Optical elements 110 can include various lenses adapted to focus or redirect radiation 125 emitted by illumination source 102.

Radiation 125 that is directed onto light modulator 200 is modulated in accordance with controller 160 which selectively controls various pixel regions 210 of light modulator 200 to form various radiation beams. Image data 120 is employed by controller 160 to generate various radiation beams which are directed along a path towards an imageable surface of a recording media 130 to form various image pixels 140 thereon as required by image data 120. Other radiations beams not required by the formation of various image pixels 140 are directed elsewhere. In this illustrated embodiment, the radiation beams required to form image pixels 140 pass through an aperture 150 while radiation beams not required to form image pixels 140 are obstructed by aperture 150. One or more lenses (not shown) may be employed to direct radiation beams from light modulator 200 towards aperture 150. One or more optical elements 170 are employed to direct various radiation beams onto the imageable surface of recording media 130. Various other embodiments of the invention need not employ aperture 150, and radiation beams not required by the formation of various image pixels 140 may fall by design outside the entrance pupil of a lens of optical elements 170.

Radiation beams can be used to form image pixels 140 on recording media 130 by different methods. For example, radiation beams can be used to ablate a surface of recording media 130. Radiation beams can be used to cause transference of an image-forming material from a donor element to a surface of recording media 130 (e.g. a thermal transfer process). Recording media 130 can include an image modifiable surface, wherein a property or characteristic of the modifiable surface is changed when irradiated by a radiation beam.

Interactions between the radiation beams and the recording media 130 can vary during the formation of corresponding image pixels 140. For example, various arrangements of image pixels 140 can be formed from plurality of imagings referred to as "shots." During each shot, imaging apparatus 100 is positioned relative to a region of recording media 130. Once positioned, light modulator 200 is activated to form a first group of image pixels 140 on the region of recording media 130. Once these image pixels 140 are formed, relative movement between light modulator 200 and recording media 130 is effected to position apparatus 100 in the vicinity of an adjacent region and another shot is taken to form a next group of image pixels 140 on the adjacent region. Various image pixels 140 can also be formed by scanning. Scanning can include establishing relative movement between light modulator 200 and recording media 130 as the light modulator 200 is activated to form the desired image pixels 140. Relative movement can include moving one or both of light modulator 200 and recording media 130. In some example embodiments of the invention, scanning can be performed by deflecting radiation beams emitted by light modulator 200 relative to recording media 130 to form the image pixels 140.

Figure 3A:
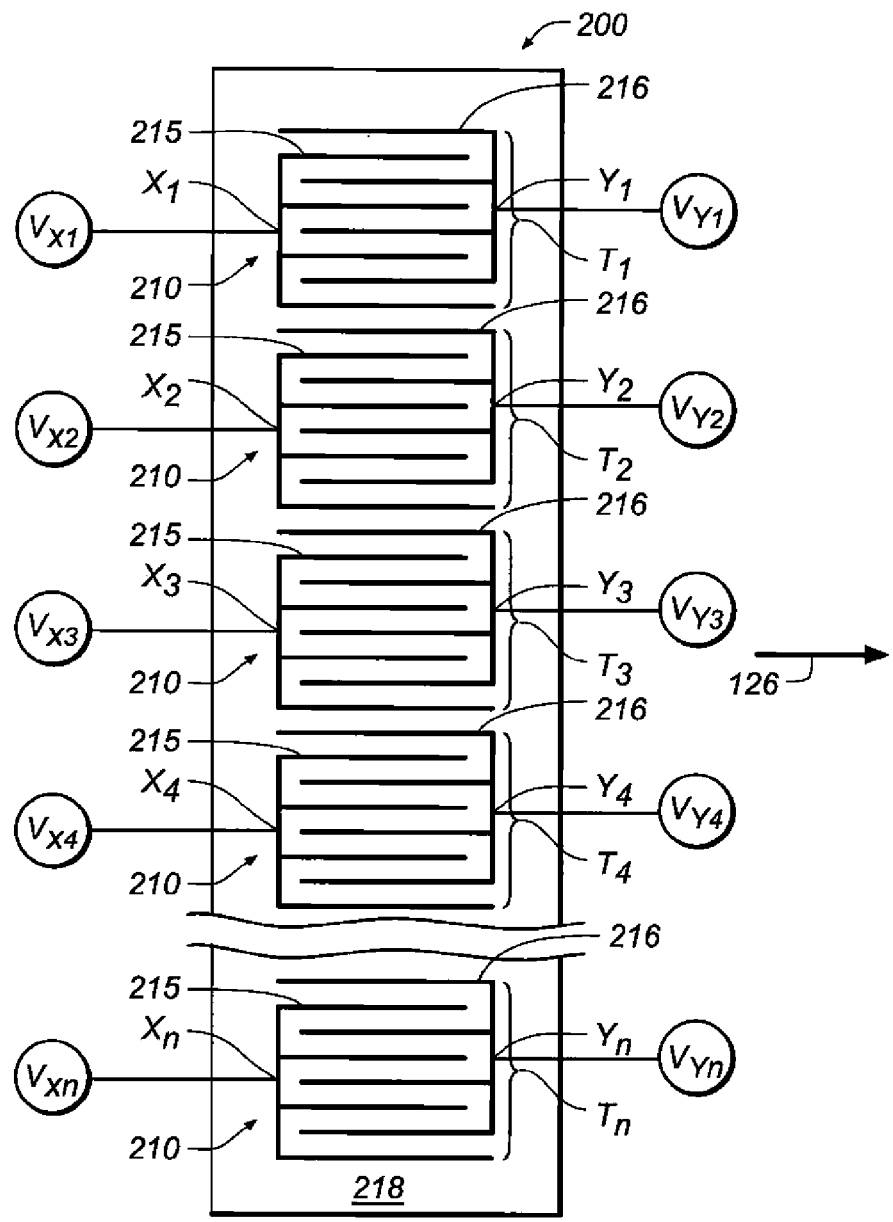
FIG. 3A is a schematic plan view of a light modulator as per an example embodiment of the invention.
Figure 3B:
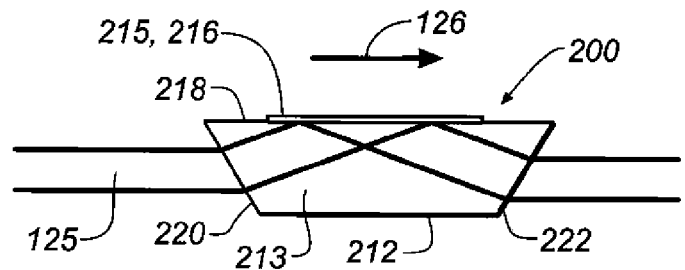
FIG. 3B is a schematic side view of the light modulator of FIG. 3A.

FIGS. 3A and 3B schematically show corresponding plan and side views of one exemplary embodiment of light modulator 200. In this example embodiment of the invention, light modulator 200 is a TIR light modulator. Light modulator 200 includes a member 212 comprising an electro-optic material 213. Electro-optic material 213 can include lithium niobate ($LiNbO_3$) or lithium tantalate ($LiTaO_3$) for example. Electro-optic material 213 can include a suitably chosen material which exhibits birefringent characteristics in response to the application of a suitable electric field. A plurality of electrodes 215 and 216 are arranged on a surface 218 of member 212. Member 212 includes surfaces 220 and 222 which are arranged to cause radiation 125 to refract and undergo total internal reflection at surface 218. Other example embodiments of the invention can employ other orientations between various ones of surfaces 218, 220, and 222 and radiation 125 to cause the total internal reflection.

As shown in FIG. 3A, each of the electrodes 215 and 216 are elongate in form and extend along directions that are substantially parallel to an overall direction of travel 126 of radiation 125. Electrodes 215 and 216 are electrically conductive elements that can be formed on a common contiguous surface by various techniques known in the art. In some example embodiments, electrodes 215 and 216 are formed by sputtering metal (e.g. gold) on surface 218. Other metal deposition methods can include evaporation. Coated surface 218 is then coated with a suitable photo-resist which is patterned by exposure to light (e.g. ultraviolet light) through a suitable mask. A development of the photo-resist removes the photo-resist locally according to the pattern, and the electrodes 215 and 216 are formed by chemically etching away metal that is not protected by the photo-resist. Other embodiments of the invention, may employ a lift-off technique in which a photo-resist is first applied to surface 218 and is patterned. Metal is then sputtered onto both surface 218 and the patterned photo-resist. The photo-resist is then dissolved so that the metal deposited on the photo-resist is removed while leaving other metal attached to surface 218 in areas where the photo-resist was absent during sputtering. In this illustrated embodiment of the invention, electrodes 215 and 216 are jointly formed on a single uniform surface.

In this illustrated embodiment, various electrodes 215 are coupled to one another to form a plurality of first electrode sets $X_1, X_2, X_3, X_4 \ldots X_n$ (collectively referred to as first electrode sets X) while various electrodes 216 are coupled to one another to form a plurality of second electrode sets $Y_1, Y_2, Y_3, Y_4 \ldots Y_n$ (collectively referred to as second electrode sets Y). Each of the first and second electrode sets X and Y include four (4) respective electrodes 215 and 216. Other example embodiments of the invention can include first and second electrode sets X and Y made up of other suitable numbers of electrodes. The electrodes 215 within a given first electrode set X are electrically driven by a corresponding one of individually controllable first voltage sources: $V_{X1}, V_{X2}, V_{X3}, V_{X4} \ldots V_{Xn}$ (collectively referred to as first voltage sources $V_X$). Each of the electrodes 216 within a given second electrode set Y are electrically driven by a corresponding one of individually controllable second voltage sources: $V_{Y1}, V_{Y2}, V_{Y3}, V_{Y4} \ldots V_{Yn}$ (collectively referred to as second voltage sources $V_Y$).

First and second electrode sets X and Y are arranged such that an electrode 215 is adjacent to an electrode 216. In this example embodiment of the invention, each of the first electrodes sets X are arranged with another of the electrode sets Y such that their respective electrodes are interdigitated with respect to one another. In this example embodiment of the invention, each of the interdigitated electrode sets X and Y belongs to an electrode group T (i.e. one of electrode groups $T_1, T_2, T_3, T_4 \ldots T_n$). Each of the various pixels regions 210 of light modulator 200 include a portion of electro-optic material 213 and one of the electrode groups T. Accordingly, in this example embodiment of the invention, each of the pixel regions 210 includes an electrode group T which includes first and second electrode sets X and Y that are separately drivable with respect to one another. That is, an electric field can be established with the electro-optic material 213 corresponding to a given pixel region 210 by appropriately driving one or both of the voltage sources $V_X$ and $V_Y$ corresponding to the given pixel region 210. In this illustrated embodiment, both voltage sources $V_X$ and $V_Y$ corresponding to given pixel region 210 are driven to impart various birefringent states on the portion of the electro-optic material associated with the given pixel region 210. Each of the pixel regions 210 is individually addressable by controlling a corresponding group of voltage sources $V_X$ and $V_Y$. In this regard, various groups of voltage sources $V_X$ and $V_Y$ can be operated independently of other groups of voltage sources $V_X$ and $V_Y$.

Each of the groups of voltage sources $V_X$ and $V_Y$ is selectively operated by controller 160 (not shown in FIG. 3A) to activate a corresponding pixel region 210 between various states. Controller 160, which can include one or more controllers is used to control one or more systems of imaging apparatus 100 including, but not limited to, the light modulator 200. In this example embodiment, controller 160 is programmed to address light modulator 200 in accordance with image data 120 which includes information representing an image to be formed. Various systems can be controlled using various control signals and by implementing various methods. Controller 160 can be configured to execute suitable software and can include one or more data processors, together with suitable hardware, including by way of non-limiting example: accessible memory, logic circuitry, drivers, amplifiers, A/D and D/A converters, input/output ports and the like. Controller 160 can comprise, without limitation, a microprocessor, a computer-on-a-chip, the CPU of a computer or any other suitable microcontroller.

Figure 4:
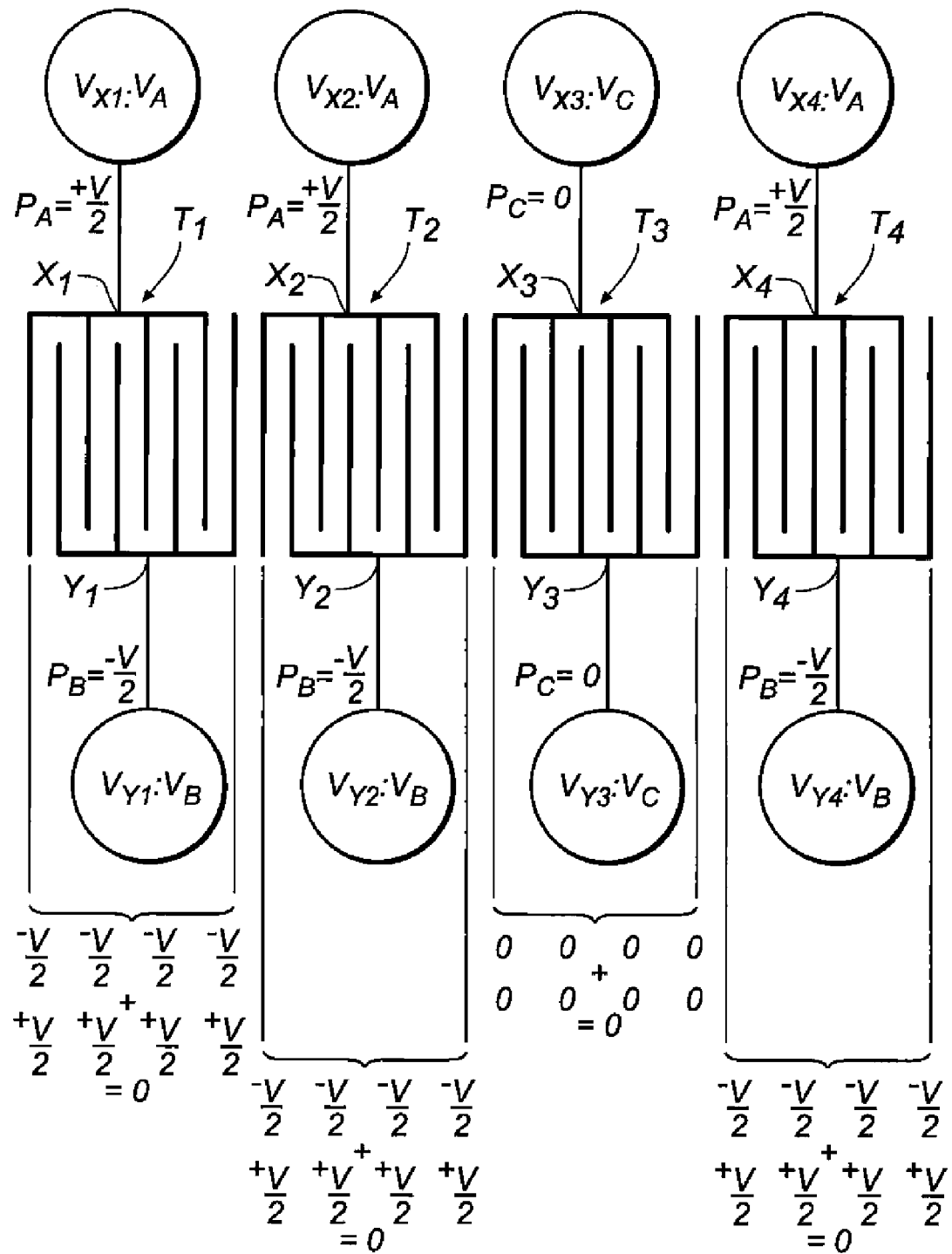
FIG. 4 schematically shows a subset of electrode groups of the modulator of FIG. 3A driven by various voltage levels.

FIG. 4 schematically shows a subset of the electrode groups T (i.e. electrode groups $T_1, T_2, T_3$, and $T_4$) of light modulator 200 driven by their corresponding voltage sources $V_X$ and $V_Y$ to establish various electric potentials on each of the first electrode sets X and on each of the second electrode sets Y associated with each of the electrode groups T. In particular, first voltage sources $V_{X1}, V_{X2}$, and $V_{X4}$ are driven to apply a voltage $V_A$ to each of their corresponding first electrode sets $X_1, X_2$, and $X_4$ to impose an electric potential $P_A$ thereon. Second voltage sources $V_{Y1}, V_{Y2}$, and $V_{Y4}$ are driven to apply a voltage $V_B$ to each of their corresponding second electrode sets $Y_1, Y_2$, and $Y_4$ to impose an electric potential $P_B$ thereon. First and second voltage drives $V_{X3}$ and $V_{Y3}$ are driven to apply a voltage $V_C$ to each of their corresponding first and second electrode sets $X_3$ and $Y_3$ to impose an electric potential $P_C$ thereon. It is understood that only the subset of electrode groups $T_1, T_2, T_3$, and $T_4$ is depicted for clarity and other electrode groups T of light modulator 200 can be activated in a similar fashion.

In various example embodiments of the invention, electric potentials $P_A$, $P_B$, and $P_C$ are selectively imposed on the first and second electrode sets X and Y of each of the electrode groups T in accordance with a desired activation state of a pixel region 210 associated with each of the electrode groups T. Activation states can include for example: an ON state in which a pixel region 210 is activated to form an image pixel 140 on recording media 130 and an OFF state in which a pixel region 210 is activated not to form a corresponding image pixel 140 on recording media 130. In various example embodiments of the invention, various ones of electric potentials $P_A$, $P_B$, and $P_C$ are selectively applied to the first and second electrode sets X and Y of each of the electrode groups T to impart a desired birefringent state on a portion of the electro-optic material 213 associated with each of the electrode groups T. In this example embodiment, electric potentials $P_A$, $P_B$, and $P_C$ are each different from one another.

In this example embodiment of the invention, it desired that each pixel region 210 corresponding to electrode groups $T_1$, $T_2$, and $T_4$ be activated in accordance with an OFF state while the pixel region 210 corresponding to electrode group $T_3$ be activated in accordance with an ON state. In this example embodiment, the electric potentials applied to each of the first electrode sets X are selected from a first group comprising a plurality of predetermined electric potential values including values corresponding to each of electric potentials $P_A$ and $P_C$. The electric potentials applied to each of the second electrode sets Y are selected from a second group comprising a plurality of predetermined electric potential values including values corresponding to each of electric potentials $P_B$ and $P_C$. In this example embodiment, electric potentials values corresponding to each of electric potentials $P_A$ and $P_B$ are different from one another. In this example embodiment, the electric potential values corresponding to each of the electric potentials $P_C$ are different from the electric potential values corresponding to each of the electric potentials $P_A$ and $P_B$. In this example embodiment, the first group of electric potential values includes at least one electric potential value that is not common with any of the electric potential values of the second group of electric potential values. In this example embodiment, the second group of electric potential values includes at least one electric potential value that is not common with any of the electric potential values of the first group of electric potential values. In this example embodiment, the first group of electric potential values and the second group of electric potential values together comprise three different electric potential values. The electric potential values can be the same or different from the electric potentials that are imposed as a result of their selection. In some cases, various losses can cause differences.

In various example embodiments, electric potential information is maintained. The electric potential information can specify a first combination of electric potentials to impose on associated first and second set of the electrodes X and Y in the event that a first activation state is desired. The electric potential information can specify a second combination of electric potentials to impose on the first and second sets of the electrodes X and Y in the event that a second activation state different from the first activation state is desired. In some of these embodiments, the first combination of electric potentials comprises a plurality of electric potentials that are not common with any of the electric potentials of the second combination of electric potentials. A desired activation state is determined and electric potential imposed on each of the first and second sets of the electrodes X and Y according to the electric potential information corresponding to the determined desired activation state.

The selection of an electric potential value from each of the predetermined first and second groups of electric potential values can be based at least on image data 120. In an illustrated embodiment, controller 160 (not shown in FIG. 4) has selected a combination of electric potential values corresponding to common electric potentials $P_C$ according to a first image data signal (i.e. an ON image data signal) and a combination of different electric potential values corresponding to electric potentials $P_A$ and $P_B$ according to a different second image data signal (i.e. an OFF image data signal).

In this example embodiment, an electric potential difference between the combination of electric potentials $P_C$ applied to electrode group $S_3$ is substantially null and a first birefringent state corresponding to this electric potential difference is imposed on the associated pixel region 210. This first birefringent state can be selected to not cause substantial diffraction in the radiation emitted from the associated pixel region 210. In this example embodiment, an electric potential difference between the combination of electric potentials $P_A$ and $P_B$ applied to each of the electrode groups $T_1$, $T_2$, and $T_4$ is sufficient to impose a second birefringent state on each of their associated pixel regions 210. This second birefringent state can be selected to cause substantial diffraction in the radiation emitted from each of the associated pixel regions 210.

In various example embodiments of the invention, each of the electric potentials $P_A$, $P_B$, and $P_C$ is selected such that an average of the electric potentials applied to an electrode group T to impart a first birefringent state onto its associated pixel region 210 is approximately equal to an average of the electric potentials applied to an electrode group T to impart a second birefringent state onto its associated pixel region 210. In this example embodiment, the values of $P_A$, $P_B$, and $P_C$ are selected such that the sum of electric potentials $P_C$ and $P_C$ is approximately equal to the sum of electric potentials $P_A$ and $P_B$. For example, in this illustrated embodiment, first and second voltage sources $V_{X3}$ and $V_{Y3}$ are driven to apply a voltage $V_C$ impose an electric potential $P_C$ of approximately 0 Volts (i.e. a ground potential) on each of their corresponding first and second electrode sets $X_3$ and $Y_3$. Each of first voltage drives $V_{X1}$, $V_{X2}$, and $V_{X4}$ are driven to apply a voltage $V_A$ to each of their corresponding first electrode sets $X_1$, $X_2$, and $X_4$ to impose an electric potential $P_A$ of +V/2 Volts thereon. Each of second voltage drives $V_{Y1}$, $V_{Y2}$, and $V_{X4}$ are driven to apply a voltage $V_B$ to each of their corresponding second electrode sets $Y_1$, $Y_2$, and $Y_4$ to impose an electric potential $P_B$ of −V/2 Volts thereon. In this example embodiment of the invention, voltages $V_A$ and $V_B$ impose corresponding electric potentials $P_A$ and $P_B$ that are different from one another. Specifically, electric potentials $P_A$ and $P_B$ are each substantially equal in magnitude, but comprise different polarities.

Accordingly, an electric potential difference sufficient to establish the first desired birefringent state (i.e. 0 Volts in this example) exists in electrode group $T_3$ while an electric potential difference sufficient to establish the second birefringent state (i.e. V Volts in this example) exists in each of electrode groups $T_1$, $T_2$, and $T_4$. In this example embodiment, light modulator 200 is driven such that the sums of the electric potentials combinations used to create each of the different birefringent states are approximately equal to one another. That is, a first sum of electrical potentials $P_C$ and $P_C$ (i.e. the sum of 0 Volts and 0 Volts) approximately equals a second sum of electrical potentials $P_A$ and $P_B$ (i.e. the sum of +V/2 Volts and −V/2 Volts). Unlike the aforementioned conventional TIR modulator 10 in which a variance of V/2 Volts was created in the average electrical potentials between non-diffracting and diffracting regions of TIR modulator 10, such variances are reduced in the light modulator 200 of the present invention. Light modulator 200 is driven in a balanced manner as opposed to the un-balanced manner that conventional light TIR modulator 10 was driven.

Figure 5:
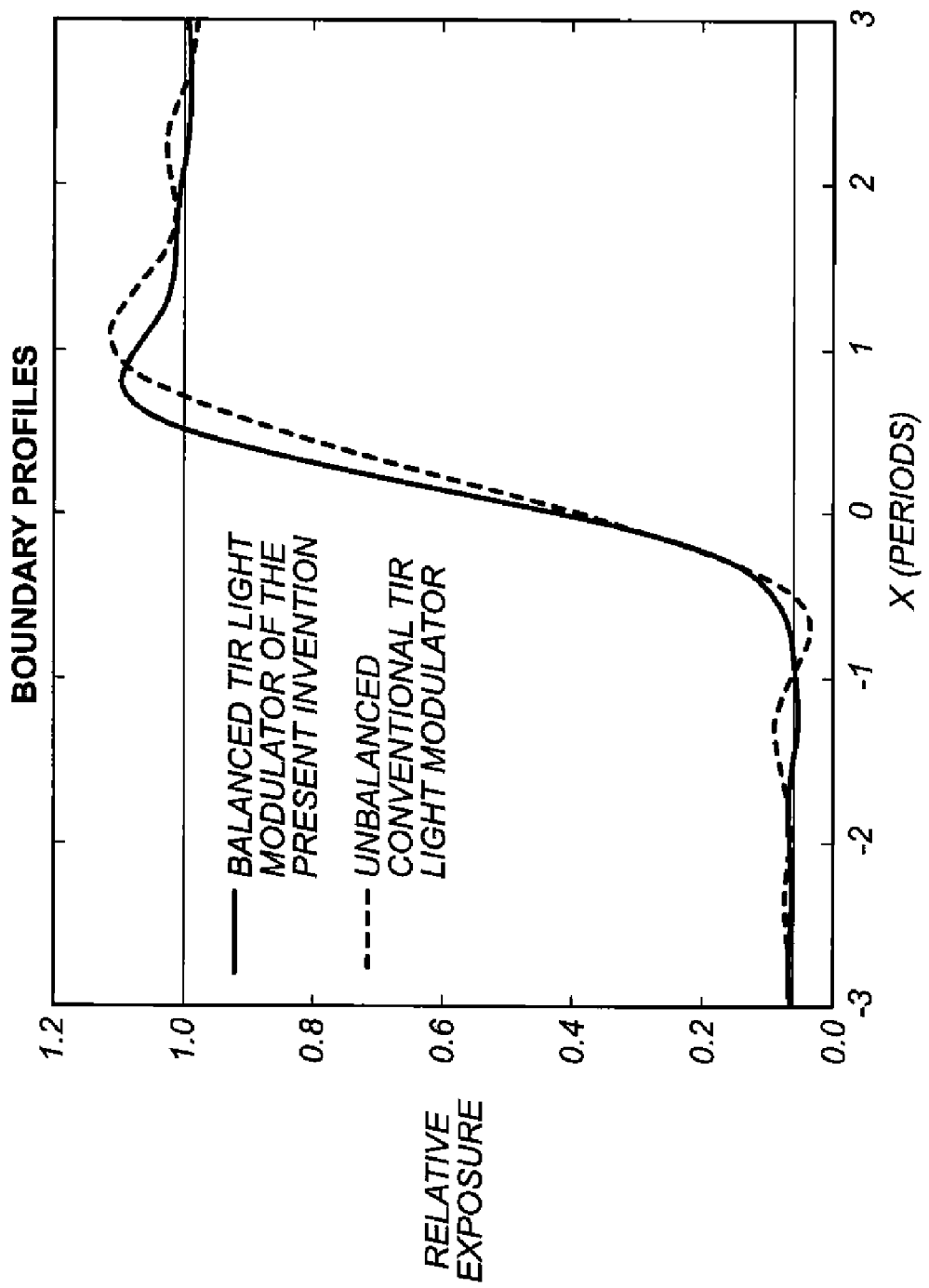
FIG. 5 is graph comparing simulated exposure profiles at the boundary of diffracting and non-diffracting regions created in a balanced light modulator of the present invention and in an unbalanced conventional TIR light modulator.

Numerous advantageous can accompany light modulators produced or operated as per various embodiments of the invention. For example, the presence of the aforementioned long-range electric fields can be reduced. Image pixel positional variances associated with beam steering effects can be reduced. Improvements in the edge sharpness of formed image pixels 140 can also be achieved. For example, FIG. 5 is a graph comparing simulated exposure profiles at the boundary of a diffracting and non-diffracting region created in a balanced light modulator 200 of the present invention and in an unbalanced conventional TIR light modulator. Each of the diffracted and non-diffracted regions is shown to be approximately three periods wide, wherein one period corresponds to a pair of the electrodes (i.e. one first electrode X and one second electrode Y). The boundary transition for the balanced light modulator 200 of the present invention is steeper (i.e. sharper) than that of the unbalanced conventional TIR light modulator. A steeper boundary transition can lead to better defined image feature edges.

Figure 6A:
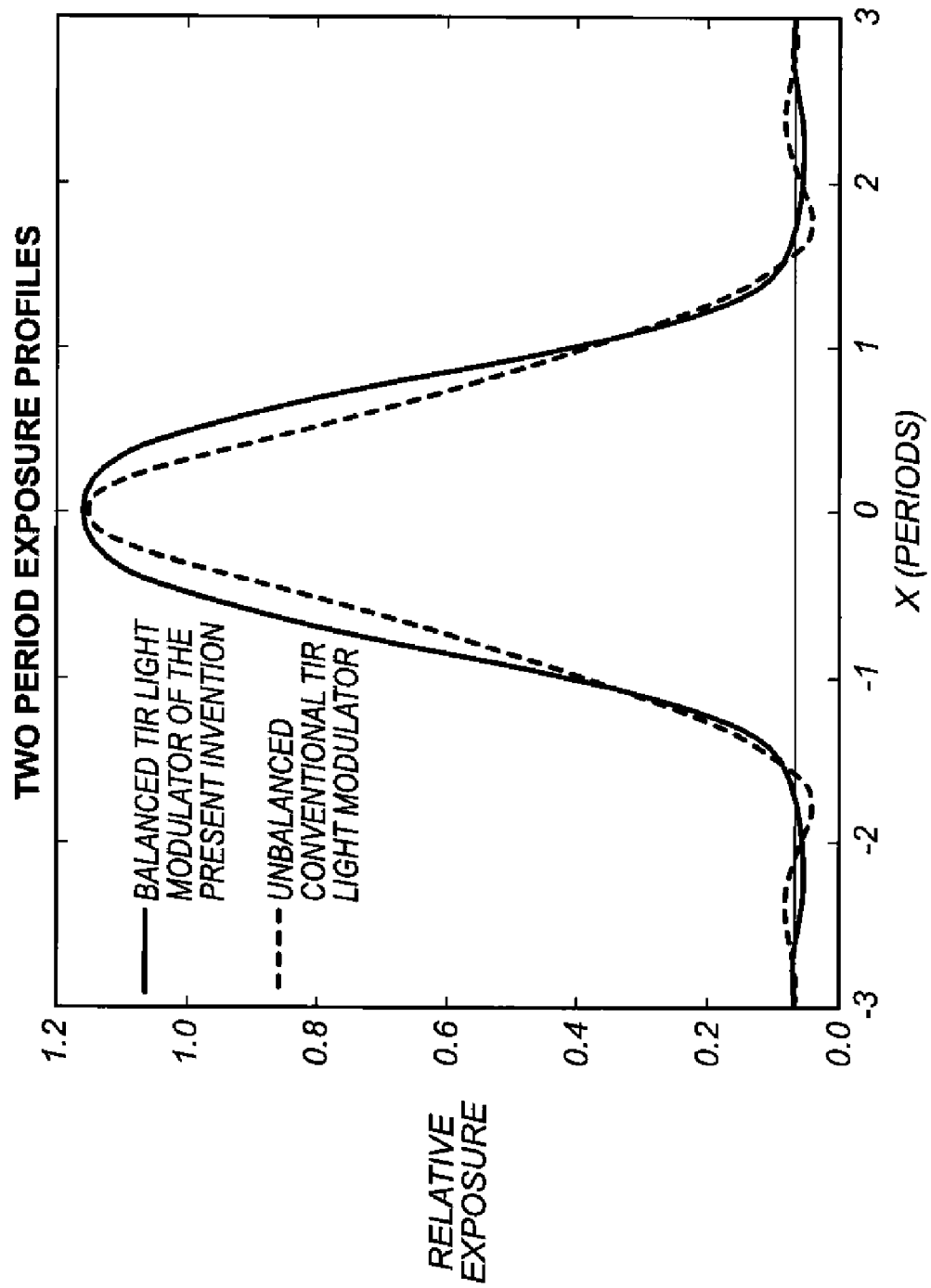
FIG. 6A is a graph simulating two period pixel exposure profiles associated with the formation of an image pixel as compared between a balanced light modulator of the present invention and an unbalanced conventional TIR light modulator.

Other advantages can include improvements in the exposure profiles associated with the formation of a given image pixel 140. For example, FIGS. 6A and 6B are graphs simulating the exposure profiles associated with the formation of an image pixel as compared between a balanced light modulator 200 of the present invention and an unbalanced conventional TIR light modulator. FIG. 6A compares exposure profiles formed by pixel regions 210 comprising two pairs of first and second electrodes X and Y (i.e. a two period pixel exposure profile). The exposure profile associated with the balanced light modulator 200 of the present invention is shown to be "fuller" than that of the unbalanced conventional TIR light modulator. A fuller profile can lead to less variation in the image pixels 140 as a consequence of variations in the exposure.

FIG. 6B compares exposure profiles formed by pixel regions 210 comprising a single pair of first and second electrodes X and Y (i.e. a one period pixel exposure profile). In this case, the exposure profile associated with the un-balanced conventional TIR light modulator is significantly deficient in its overall exposure and is likely not suitable for forming a corresponding image pixel 140. In contrast, the balanced light modulator 200 of the present invention provides significantly greater exposure. Various light modulators 200 provided by the present invention might therefore be used to form image pixels 140 with higher resolutions, and in this case, resolutions as small as those associated with a single pair of first and second electrodes X and Y.

It is to be noted the various profiles of the TIR light modulator 200 in FIGS. 6A and 6B exceed unity. The intensity of imaging radiation associated with the various exposure profiles plotted in FIGS. 6A and 6B is relative to the intensity of an un-diffracted radiation beam emitted by an associated pixel region. When image data 120 is imposed by a TIR light modulator, imaging radiation appears at angles intermediate between zero and first diffraction orders. Subsequent diffraction of the imaging radiation by an order blocker (e.g. aperture 150) causes the final exposure profile to have an oscillatory form. This effect is responsible for the overshoot of the final intensity at the transition between diffracting and non-diffracting regions of the TIR light modulator. In some cases, this effect can cause the peak intensity to exceed unity.

Figure 7:
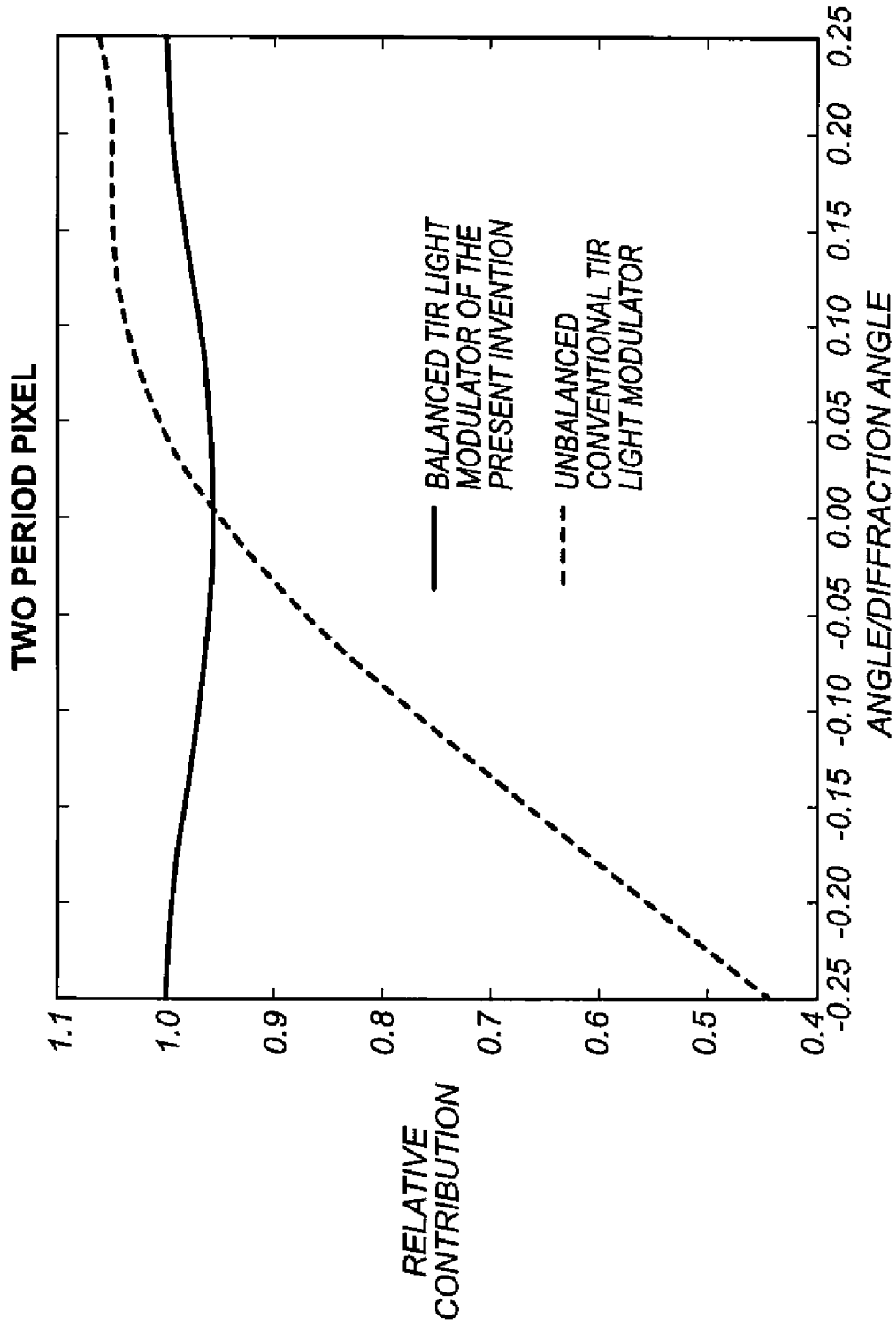
FIG. 7 shows a graph which simulates how radiation emitted by an illumination source is utilized by a balanced light modulator of the present invention and by an unbalanced conventional TIR light modulator.

One possible reason for the improvements provided by various embodiments of the invention is that a balanced light modulator 200 makes better use of the pupil of a lens used to image radiation emitted by the light modulator 200 (e.g. a lens associated with optical element 170). Light modulators 200 of the present invention can also make better use of the illumination. FIG. 7 shows a graph which simulates how radiation emitted by illumination source 102 is utilized by a balanced light modulator 200 of the present invention and by an unbalanced conventional TIR light modulator. In this case each of the modulators is modeled with a two period pixel configuration. Typically, the utilization of the radiation varies with the angle at which the radiation passes through the system. In FIG. 7, the angle is expressed as a fraction of the diffraction angle and the illumination is shown extending from −0.25 to +0.25. In the case of the unbalanced conventional TIR modulator, the illumination contribution varies quite strongly as a function of the angle. This can lead to various problems such as those previously mentioned in regards to exposure profile shape and overall exposure levels. These problems can be especially sensitive to the details of the illumination angular distribution. In the case of the balanced light modulator 200 of the present invention, FIG. 7 shows that the illumination contribution does not vary significantly as a function of the angle, a result which can lead to enhanced imaging characteristics.

In other example embodiments of the invention, light modulator 200 can be driven using different techniques. For example, a common electric potential $P_C$ imposed on each of the first and second electrode sets X and Y of a particular electrode group T need not be selected to be a null or a ground potential. A first voltage source $V_X$ and its corresponding second voltage source $V_Y$ can be driven to apply voltages $V_C$ to impose non-zero electric potentials of $V_O$ Volts on each of the corresponding first and second electrode sets X and Y in accordance with a first desired birefringent state. When a change from the first birefringent state to a second birefringent state is desired (i.e. for example when change in a image data signal is encountered), the first voltage source $V_X$ can be driven to adjust voltage $V_C$ applied to the first electrode set X by a first amount (e.g. V/2 Volts) to create an adjusted voltage equal to $V_C+V/2$, and the second voltage source $V_Y$ can be driven to adjust the voltage applied to the second electrode set Y by a second amount (e.g. V/2 Volts) to create an adjusted voltage equal to $V_C-V/2$. The applied voltages are selected such that the sum of the voltages applied to the first and second electrode sets X and Y during the establishment of the first birefringent state (i.e. the sum of $V_O$ and $V_O$) approximately equals the sum of the adjusted voltages applied to the first and second electrode sets X and Y during the establishment of the second birefringent state (i.e. the sum of $V_O+V/2$ and $V_O-V/2$). Each of the initially applied voltages are selected to create an electric potential difference suitable for the establishment of the first birefringent state and each of the adjusted applied voltages are selected to create an electric potential difference suitable for the establishment of the second birefringent state. In this example embodiment, each of the applied voltages is selected to cause each of the electric potentials applied to each of the first and second electrodes X and Y during the establishment of either birefringent state to be uni-polar in nature. A uni-polar drive can be employed to simplify drive requirements.

In some example embodiments of the invention, the sum of the electric potentials applied to each of the first and second associated electrodes sets X and Y is adjusted to be equal for each birefringent state while approximating an electric potential difference required by a particular state. For example, an electric potential of 50 Volts can be imposed on a first electrode set X while imposing an electric potential of 40 Volts on an associated second electrode set Y to create a 10 volt electric potential difference required by a first birefringent state. A second birefringent state requiring at least an 80 Volt electric potential difference can be achieved by changing the electric potential imposed on the first set of electrodes X to 90V and by changing the electric potential imposed on the second set of the electrodes Y to 0 Volts to create the necessary electric potential difference required by the second birefringent state while maintaining equal sums (i.e. in this example embodiment, a first sum of 50+40 Volts is approximately equal to a second sum of 90+0 Volts). In this example embodiment, all of the electric potentials are selected from electric potential values that are different from each other.

In some example embodiments of the invention, the equality of the sums (or averages) of the electrode electric potentials between first and second birefringent states is not exact, but rather approximate. For example, a first birefringent state in which an electric potential of 40 Volts is imposed on each of the first and second electrode sets X and Y can be changed to second birefringent state in which the electric potential imposed on the first electrode set X is adjusted to 85 Volts (i.e. the electric potential of 40V is increased by an amount equal to 45 Volts) while the electric potential imposed on the second electrode set Y is adjusted to 5 Volts (i.e. the electric potential of 40 Volts is decreased by an amount equal to 35 Volts). In this example, embodiment, the applied voltages are not varied by the same amount but by amounts which are approximately equal to one another to within 10 volts. Although the sums of the electrical potentials are not exact but approximate (i.e. a difference of 5 Volts exists), the difference is significantly less than the 35V difference that would exist in conventional TIR modulator 10 operated under the same conditions. In some example embodiments of the invention, the lesser of the sums (or averages) of the electric potentials associated with each of two different birefringent states is at least 80% of the greater of the sums (or averages) of the electric potentials associated with each of the two different birefringent states. In other example embodiments of the invention, the lesser of the sums (or averages) of the electric potentials associated with each of two different birefringent states is at least 90% of the greater of the sums (or averages) of the electric potentials associated with each of the two different birefringent states. In yet other example embodiments, the lesser of the sums (or averages) of the electric potentials associated with each of two different birefringent states is at least 95% of the greater of the sums (or averages) of the electric potentials associated with each of the two different birefringent states.

In some example embodiments of the invention, a plurality of different birefringent states can be imposed in the electro-optic material 213 of a given pixel region 210 such that various degrees of diffraction are established for each of the states. In some example embodiments, a first birefringent state can be associated with an electric potential difference that is not null but some value associated with a diffraction amount that is tolerable by the required activation state. A first birefringent state can be used to create a partial diffractive state that can be used to adjust the output radiation emitted from an associated pixel region 210. The partial diffraction state can be associated with an ON activation state and can differ from a diffraction state associated with an OFF activation state. For example, in various embodiments of the invention an electric potential difference in the range of 0 to 20 Volts between associated first and second electrodes sets X and Y can be associated with an ON activation state while an electric potential difference of about 80 Volts can be associated with an OFF activation state. A ratio of the electric potential differences associated with two different birefringent states or two different activation states can be 25% or less in some example embodiments, 12% or less in other example embodiments, and 5% or less in yet other example embodiments. In some example embodiments, different ratios can be associated with different pixel regions 210.

The greater of the electric potential differences created between the electrodes of an associated electrode sets X and Y (e.g. the previously described 80 Volt difference associated with an OFF activation state) is typically referred to as the operating potential difference. A difference between the sums of the electric potentials applied to each of the first and second associated electrodes sets X and Y during different activation states can arise and in some example embodiments a ratio of this difference to the operating potential difference associated with the first and second associated electrodes sets X and Y can be 50% or less. In other example embodiments, this ratio can be 30% or less, and even 20% or less in yet other embodiments. Alternatively, when considering a difference between the averages of the electric potentials applied to each of the first and second associated electrodes sets X and Y during different activation states, a ratio of the average voltage differences to the operating potential value can be 25% or less in some embodiments, 15% or less in other embodiments and 10% or less in yet other embodiments.

The invention has been described in detail with particular reference to certain preferred embodiments thereof, but it will be understood that variations and modifications can be effected within the scope of the invention.

PARTS LIST

10 TIR modulator
12 member
15 electrodes
16 electrodes
18 surface
20 surface
22 surface
25 input radiation
27 output radiation
100 imaging apparatus
102 illumination source
110 optical element(s)
120 image data
125 radiation
126 direction of travel
130 recording media
140 image pixel
150 aperture
160 controller
170 optical element(s)
200 light modulator
210 pixel region
212 member
213 electro-optic material
215 electrode
216 electrode
218 surface
220 surface
222 surface
$P_A$ electric potential
$P_B$ electric potential
$P_C$ electric potential
$S_1$ electrode group
$S_2$ electrode group
$S_3$ electrode group
$S_4$ electrode group
$S_n$ electrode group
$T_1$ electrode group
$T_2$ electrode group
$T_3$ electrode group
$T_4$ electrode group
$T_n$ electrode group
$V_1$ voltage source
$V_2$ voltage source
voltage source
$V_4$ voltage source $V_n$ voltage source
$V_A$ voltage
$V_B$ voltage
$V_C$ voltage
$V_{X1}$ first voltage source
$V_{X2}$ first voltage source
$V_{X3}$ first voltage source
$V_{X4}$ first voltage source
$V_{Xn}$ first voltage source
$V_{Y1}$ second voltage source
$V_{Y2}$ second voltage source
$V_{Y3}$ second voltage source
$V_{Y4}$ second voltage source
$V_{Yn}$ second voltage source
$X_1$ first electrode set
$X_2$ first electrode set
$X_3$ first electrode set
$X_4$ first electrode set
$X_n$ first electrode set
$Y_1$ second electrode set
$Y_2$ second electrode set
$Y_3$ second electrode set
$Y_4$ second electrode set
$Y_n$ second electrode set

The invention claimed is:

1. An imaging method comprising:
emitting radiation from an illumination source towards a total internal reflection (TIR) modulator, the TIR modulator comprising:
a member comprising an electro-optic material;
a plurality of individually addressable pixel regions; and
wherein each pixel region comprises a first set of electrodes arranged in an interdigitated relationship with a second set of electrodes;
controlling at least one of the pixel regions to form at least one image pixel on a surface;
imposing a first electric potential on the first set of electrodes of a pixel region in accordance with a first electric potential value selected from a first predetermined group of electric potential values;
imposing a second electric potential on the second set of electrodes of the pixel region in accordance with a second electrical potential value selected from a second predetermined group of electric potential values;
wherein the first predetermined group of electric potential values and the second predetermined group of electric potential values together comprise at least three different electric potential values; and operating a first voltage source to impose the first electric potential on the first set of electrodes of the pixel region and separately operating a second voltage source to impose the second electric potential on the second set of the electrodes of the pixel region.

2. A method according to claim 1, wherein each of the first predetermined group of electric potential values and the second predetermined group of electric potential values comprises a common electric potential value.

3. A method according to claim 2, wherein the common electric potential value is selected from each of the first predetermined group of electric potential values and the second predetermined group of electric potential values in accordance with a first image data signal.

4. A method according to claim 1, wherein each of the electric potential values of the first predetermined group of electric potential values is different from any of the electric potential values of the second predetermined group of electric potential values.

5. A method according to claim 3, wherein the first electric potential value and the second electric potential value are different electric potential values and both the first electric potential value and the second electric potential value are selected in accordance with a second image data signal that is different from the first image data signal.

6. A method according to clam 2, wherein each of the first electric potential value, the second electric potential value and the common potential value are different electric potential values.

7. A method according to claim 1, wherein the first electric potential value is different from the second electric potential value and an average of the first electric potential value and the second electric potential value is approximately equal to another electric potential value of at least one of the first predetermined group of electric potential values and the second predetermined group of electric potential values.

8. A method according to claim 1, wherein the first electric potential value is different from the second electric potential value, and a sum of the first electric potential value and the second electric potential value is approximately equal to a sum of another electric potential value, of the first predetermined group of electric potential values and another electric potential value of the second predetermined group of electric potential values.

9. A method according to claim 2, wherein the first electric potential value is different from the second electric potential value, and an average of the first electric potential value and the second electric potential value is approximately equal to a common electric potential value.

10. A method according to claim 1, wherein each of the first set of the electrodes and the second set of the electrodes of the pixel region are formed on a common surface of the member.

11. An imaging apparatus comprising:
an illumination source adapted for emitting radiation;
a TIR modulator comprising:
a member comprising an electro-optic material; and
a plurality of individually addressable pixel regions wherein each pixel region comprises a first set of electrodes arranged in an interdigitated relationship with a second set of electrodes;
a first voltage source adapted to apply voltage to the first set of electrodes of a pixel region;
a second voltage source adapted to apply voltage to the second set of electrodes of the pixel region;
a first optical element positioned along a path of the emitted radiation, extending from the illumination source towards the total internal reflection (TIR) modulator;
a second optical element adapted to form one or more image pixels on a surface, the one or more image pixels corresponding to one or more of the pixel regions; and
a controller programmed to:
cause a first voltage to be applied to the first set of the electrodes of the pixel region and cause a second voltage to be applied to the second set of electrodes of the pixel region, in accordance with a first image data signal; and
cause the first voltage applied to the first set of electrodes of the pixel region to be adjusted by a first amount to create an adjusted first voltage and cause the second voltage applied to the second set of electrodes of the pixel region to be adjusted by a second amount to create an adjusted second voltage, in accordance with a second image data signal; and
wherein the sum of the first voltage and the second voltage is approximately equal to a sum of the adjusted first voltage and the adjusted second voltage.

12. The imaging apparatus according to claim 11, wherein the controller is programmed to cause an electric potential difference to be created between the first voltage and the second voltage that is different than an electric potential difference that is created between the adjusted first voltage and the adjusted second voltage.

13. The imaging apparatus according to claim 12, wherein the potential difference between the first voltage and the second voltage is null.

14. The imaging apparatus according to claim 11, wherein each of the first voltage and the second voltage are approximately equal voltages.

15. The imaging apparatus according to claim 11, wherein the first voltage and the second voltage combine to induce an electric field in the electro-optic material that is different from an electric field that is induced in the electro-optic material by a combination of the adjusted first voltage and the adjusted second voltage.

16. The imaging apparatus according to claim 11, wherein the first voltage and the second voltage combine to impart a birefringent state in the electro-optic material that is different than a birefringent state imparted in the electro-optic material by a combination of the adjusted first voltage and the adjusted second voltage.

17. The imaging apparatus according to claim 11, wherein the controller is programmed to cause both the first voltage applied to the first set of electrodes of the pixel region and the second voltage applied to the second set of electrodes of the pixel region to be adjusted by approximately the same amount in accordance with the second image data signal.

18. The imaging apparatus according to claim 11, wherein the controller is programmed to cause the first amount to be within 10 Volts or less of the second amount.

19. The imaging apparatus according to claim 11, wherein the first set of electrodes and the second set of electrodes of the pixel region are arranged on a common surface of the member.

20. The imaging apparatus according to claim 11, wherein each pixel region of the plurality of individually addressable pixel regions is electrically coupled to a corresponding group of voltage sources and each of the groups of voltage sources is independently controllable from one another.

21. The imaging apparatus according to claim 11, wherein the controller is programmed to:
determine an operating electric potential difference;
determine a difference between the sum of the adjusted first voltage and the adjusted second voltage and the sum of the first voltage and the second voltage; and
operate the first voltage source and the second voltage source to cause a ratio between the difference and the operating potential difference to be 50% or less.

22. The imaging apparatus according to claim 11, wherein the controller is programmed to:
determine an operating electric potential difference;
determine a difference between the sum of the adjusted first voltage and the adjusted second voltage and the sum of the first voltage and the second voltage; and
operate the first voltage source and the second voltage source to cause a ratio between the difference and the operating potential difference to be 30% or less.

23. The imaging apparatus according to claim 11, wherein the controller is programmed to:
determine an operating electric potential difference;
determine a difference between the sum of the adjusted first voltage and the adjusted second voltage and the sum of the first voltage and the second voltage; and
operate the first voltage source and the second voltage source to cause a ratio between the difference and the operating potential difference to be 20% or less.

24. An imaging apparatus comprising:
a radiation source adapted for emitting radiation;
a light modulator comprising:
a member comprising an electro-optic material; and
a plurality of individually controllable pixel regions including a pixel region comprising a plurality of electrodes arranged in a first set and in a second set, wherein the electrodes of the first set of the electrodes are arranged in an interdigitated relationship with the electrodes of the second set of the electrodes;
a first optical element positioned along a path of the emitted radiation extending from the illumination source towards the TIR modulator;
a second optical element adapted to form one or more image pixels on a surface, the one or more image pixels corresponding to one or more of the pixel regions; and
a controller programmed to:
create an electric potential difference between the first set of the electrodes and the second set of the electrodes to impart a first birefringent state onto a portion of the electro-optic material; and
vary the electric potential difference between the first set of the electrodes and the second set of electrodes by varying a voltage applied to the first set of the electrodes by a first amount and by varying a voltage applied to the second set of the electrodes by a second amount to impart a second birefringent state onto the portion of the electro-optic material, wherein the second amount is approximately equal to the first amount.

25. The imaging apparatus according to claim 24, wherein the controller is programmed to control a first voltage source to increase the voltage applied to the first set of the electrodes by the first amount while controlling a second voltage source to decrease the voltage applied to the second set of the electrodes by the second amount to impart the second birefringent state onto the portion of the electro-optic material, wherein the second amount is equal to the first amount to within 10 Volts or less.

26. The imaging apparatus according to claim 24, wherein the controller is programmed to control a first voltage source to impose electric potential on the first set of the electrodes and control a second voltage source to impose electric potential on the second set of the electrodes, wherein a first sum of the electric potentials imposed on the first set of the electrodes and on the second set of the electrodes while imparting the first birefringent state onto the portion of the electro-optic material approximately equals a second sum of the electric potentials imposed on the first set of the electrodes and on the second set of the electrodes while imparting the second birefringent state onto the portion of the electro-optic material.

27. The imaging apparatus according to claim 26, wherein the controller is programmed to:
determine an operating electric potential difference;
determine a difference between the second sum of the electric potentials and the first sum of the electric potentials; and
operate the first voltage source and the second voltage source to cause a ratio between the difference and the operating potential difference to be 50% or less.

28. An imaging method comprising:
emitting radiation from an illumination source towards a TIR modulator, the TIR modulator comprising:
an electro-optic material; and a plurality of individually addressable pixel regions including a pixel region comprising a plurality of electrodes arranged in a first set and in a second set, and wherein the electrodes of the first set of the electrodes are arranged in an interdigitated relationship with the electrodes of the second set of the electrodes;

controlling at least one of the pixel regions to form at least one image pixel on a surface;

maintaining electric potential information specifying a first combination of electric potentials to impose on the first set of the electrodes and the second set of the electrodes in the event that a first activation state is desired and specifying a second combination of electric potentials to impose on the first set of the electrodes and the second set of the electrodes in the event that a second activation state different from the first activation state is desired, wherein the first combination of electric potentials comprises a plurality of electric potentials that are not common with any of the electric potentials of the second combination of electric potentials;

determining a desired activation state; and imposing electric potential on each of the first set of the electrodes and the second set of the electrodes according to the electric potential information corresponding to the determined desired activation state.

29. A method according to claim 28, comprising separately operating a first voltage source coupled to the first set of the electrodes and a second voltage source coupled to the second set of the electrodes to impose the electric potential on each of the first set of the electrodes and the second set of the electrodes according to the electric potential information corresponding to the determined desired activation state.

* * * * *